(12) United States Patent
Gafford

(10) Patent No.: US 10,660,474 B2
(45) Date of Patent: May 26, 2020

(54) GEO-FENCE ENABLED SYSTEM, APPARATUS, AND METHOD FOR OUTDOOR COOKING AND SMOKING

(71) Applicant: W.C. BRADLEY CO., Columbus, GA (US)

(72) Inventor: Alex Gafford, Midland, GA (US)

(73) Assignee: W.C. BRADLEY CO., Columbus, GA (US)

(*) Notice: Subject to any disclaimer, the term of this patent is extended or adjusted under 35 U.S.C. 154(b) by 439 days.

(21) Appl. No.: 15/719,089

(22) Filed: Sep. 28, 2017

(65) Prior Publication Data
US 2018/0125296 A1 May 10, 2018

Related U.S. Application Data

(60) Provisional application No. 62/419,567, filed on Nov. 9, 2016.

(51) Int. Cl.
| | |
|---|---|
| *A47J 37/07* | (2006.01) |
| *G01S 5/00* | (2006.01) |
| *G01S 19/51* | (2010.01) |
| *A47J 36/32* | (2006.01) |
| *A23B 4/052* | (2006.01) |
| *G01S 19/14* | (2010.01) |
| *H04W 4/021* | (2018.01) |
| *G01S 19/42* | (2010.01) |

(52) U.S. Cl.
CPC .......... *A47J 37/0786* (2013.01); *A23B 4/052* (2013.01); *A47J 36/321* (2018.08); *A47J 37/0713* (2013.01); *G01S 5/0027* (2013.01); *G01S 19/14* (2013.01); *G01S 19/51* (2013.01); *H04W 4/021* (2013.01); *A23V 2002/00* (2013.01); *G01S 19/42* (2013.01)

(58) Field of Classification Search
CPC ...... A47J 37/06; A47J 37/0786; A47J 36/321; A47J 37/0713; A23L 1/01; A23B 4/052; G01S 5/0027; G01S 19/14; G01S 19/51; G01S 19/42; H04W 4/021; A23V 2002/00
USPC ......................................................... 99/331
See application file for complete search history.

(56) References Cited

U.S. PATENT DOCUMENTS

| | | | | |
|---|---|---|---|---|
| 6,314,366 | B1* | 11/2001 | Farmakis | B60R 25/102 340/961 |
| 8,931,400 | B1* | 1/2015 | Allen | G01K 1/024 99/344 |
| 9,888,452 | B2* | 2/2018 | Logan | H04W 68/00 |
| 10,262,507 | B2* | 4/2019 | Sloo | G08B 25/008 |
| 2002/0055924 | A1* | 5/2002 | Liming | G01S 5/0027 |
| 2010/0000519 | A1* | 1/2010 | Zalusky | F24S 30/48 126/601 |
| 2010/0043778 | A1* | 2/2010 | Penciu | F24S 23/79 126/625 |

(Continued)

*Primary Examiner* — Jimmy Chou
(74) *Attorney, Agent, or Firm* — Dennis D. Brown; Brown Patent Law, P.L.L.C.

(57) ABSTRACT

An outdoor system for cooking and/or smoking food in which a smart phone, remote or other hand-held wireless device can be used to start the cooking and/or smoking unit. To allow the unit to he started remotely, or to permit one or more other operations to he remotely activated, the system first determines whether the hand-held device is within a predetermined geo-fence boundary distance of the cooking an or smoking unit and/or determines whether one or more other status criteria are met.

28 Claims, 5 Drawing Sheets

(56) References Cited

U.S. PATENT DOCUMENTS

| | | | |
|---|---|---|---|
| 2012/0188125 A1* | 7/2012 | Pomietlasz | G01S 13/87 342/357.68 |
| 2013/0280386 A1* | 10/2013 | Cretors | A23L 7/187 426/233 |
| 2015/0019354 A1* | 1/2015 | Chan | G06Q 50/12 705/15 |
| 2015/0036881 A1* | 2/2015 | Sharma | H04W 4/185 382/103 |
| 2015/0134761 A1* | 5/2015 | Sharma | H04L 67/26 709/207 |
| 2015/0208858 A1* | 7/2015 | Robbins | A47J 45/068 426/231 |
| 2015/0282660 A1* | 10/2015 | Sarvestani | A47J 37/0786 99/331 |
| 2015/0287091 A1* | 10/2015 | Koran | G06Q 30/0277 705/14.66 |
| 2015/0312964 A1* | 10/2015 | Sorenson | F24C 15/105 219/448.13 |
| 2015/0347955 A1* | 12/2015 | Fairbanks | H04W 4/029 705/7.16 |
| 2016/0037966 A1* | 2/2016 | Chin | A47J 37/0647 426/231 |
| 2016/0051078 A1* | 2/2016 | Jenkins | A47J 27/62 99/331 |
| 2016/0059412 A1* | 3/2016 | Oleynik | B25J 9/0087 700/257 |
| 2016/0098746 A1* | 4/2016 | Lewis | G06Q 10/02 705/14.5 |
| 2016/0123600 A1* | 5/2016 | Phillips | F24C 7/082 99/337 |
| 2016/0174748 A1* | 6/2016 | Baldwin | A47J 27/10 426/231 |
| 2016/0180325 A1* | 6/2016 | Davis | G06Q 20/085 705/44 |
| 2016/0198883 A1* | 7/2016 | Wang | A47J 27/08 426/231 |
| 2016/0198885 A1* | 7/2016 | Logan | A47J 27/62 99/325 |
| 2016/0220064 A1* | 8/2016 | Young | A47J 36/00 |
| 2017/0026506 A1* | 1/2017 | Haepp | H04W 4/021 |
| 2018/0008093 A1* | 1/2018 | Parker | A47J 37/0754 |
| 2018/0049588 A1* | 2/2018 | Moss | B67D 1/0875 |
| 2018/0213970 A1* | 8/2018 | Colston | A47J 37/07 |

* cited by examiner

GEO-FENCE ENABLED SYSTEM, APPARATUS, AND METHOD FOR OUTDOOR COOKING AND SMOKING

RELATED CASE

This application claims the benefit of U.S. Provisional Patent Application Ser. No. 62/419,567 tiled on Nov. 9, 2016 and incorporates said provisional application by reference into this document as if fully set out at this point.

FIELD OF THE INVENTION

The present invention relates to systems, apparatuses and methods for remotely activating and/or controlling operations in outdoor cookers and smokers and to the use of geo-fence requirements and parameters in relation thereto.

BACKGROUND OF THE INVENTION

Recently, gas grills have been proposed or developed which are equipped with semi-automated heating and/or cooking control systems which can he digitally connected to Smart devices such as tablets, cell phones, and the like. An example of one such system for an outdoor grill is shown and described in US2016/0037966. In the grill control system described in US 2016/0037966, each of the individual burners contained in the grill is equipped with its own independent, automated electric control valve and temperature instrument system for controlling the rate of gas flow delivered to the burner.

Unfortunately, although systems have been proposed for remotely monitoring and/or controlling the cooking operations performed in outdoor cookers, these systems have not included means for accurately and consistently ensuring that the user is sufficiently close to the outdoor cooker before allowing the user to remotely activate or control certain critical operations such as, for example, igniting the burner heating elements.

In contrast, when using a standard, non-automated outdoor gas grill or cooker, it has been necessary that the user be physically present at the cooker in order to open the gas flow valves and ignite the burner elements. This has allowed the user to verify that the cooker is in safe condition to be ignited. In other words, by being present at the cooker, the user has been able to physically observe, for example, whether the lid is open, whether there are any flammable materials in close proximity to the cooker, whether the cooker is too close to a wall of the user's home or to a fence or other structure, whether the cooker needs to be moved out from under an awning or other overhead structure, whether there are any young children in close proximity to the cooker, whether a storage covering for the cooker has been properly removed, whether anyone else may be standing close to or looking inside the cooker, etc.

When using cell phone or enabled smart phones or other smart devices for remotely activating and/or controlling outdoor cookers, the user can potentially be positioned any distance away from the outdoor cooker. Moreover, even when using shorter range radio frequency or Bluetooth enabled phones or remotes, the range of such systems is typically sufficient such that the user would still be able to remotely ignite the outdoor cooker even though the user might be indoors, on the other side of the user's house, or otherwise unable to see the cooker.

SUMMARY OF THE INVENTION

The present invention satisfies the needs and alleviates the problems discussed above.

In one aspect, there is provided an outdoor system for cooking food, smoking food, or a combination thereof comprising: (a) an outdoor cooking and/or smoking unit having an interior; (b) one or more heating elements in the interior of the outdoor cooking and/or smoking unit; (c) a control unit located within or on the outdoor cooking and/or smoking unit which includes or is electronically coupled with a GPS receiver or other GPS locating element and is enabled to activate and/or control least one operation of the outdoor cooking and/or smoking unit; and (d) a hand-held wireless device which includes or is electronically coupled with a GPS receiver or other GPS locating element and wirelessly communicates with the control unit, either directly or through a remote server or other cloud system, to remotely instruct the control unit to activate and/or control the least one operation of the of the outdoor cooking and/or smoking unit. The control unit, the hand-held wireless device, the server or other cloud system, or a combination thereof automatically determines whether the hand-held device is within a predetermined GPS distance of the outdoor cooking and/or smoking unit so that the control unit is prevented from activating and/or controlling the at least one operation of the outdoor cooking and/or smoking unit if the hand-held wireless device is located beyond the predetermined GPS distance from the outdoor cooking and/or smoking unit.

In another aspect, there is provided an outdoor system for cooking food, smoking food, or a combination thereof comprising: (a) an outdoor cooking and/or smoking unit having an interior; (b) a plurality of gas fuel burners or burner elements in the interior of the outdoor cooking and/or smoking unit; (c) a gas fuel supply system for the gas fuel burners or burner elements, the gnus fuel supply system comprising one or more fuel valves bar opening a gas fuel flow from the gas fuel supply system to the gas fuel burners or burner elements; (d) at least one ignitor in sufficient proximity to the gas fuel burners or burner elements to ignite the gas fuel burners or burner elements; (e) a hand-held wireless device which includes or is electronically coupled with a GPS receiver or other GPS locating element and can be operated to remotely transmit a wireless instruction, either directly or through a remote server or other cloud system, to ignite the gas fuel burners or burner elements; and (f) a control unit located within or on the outdoor cooking and/or smoking unit which includes or is electronically coupled with a GPS receiver or other GPS locating element and which automatically receives the instruction from the hand-held wireless device to ignite the gas fuel burners or burner elements. The control unit comprises a processing unit and a program c de which is embodied on a computer readable storage component and is readable by the processing unit to cause the control unit to perform a programmed procedure in which the control unit automatically (i) determines whether the hand-held device is within a predetermined GPS distance of the outdoor cooking and/or smoking unit and, if the hand-held device is within Me predetermined GPS distance from the outdoor cooking and/or smoking unit, then (ii) opens the one or more fuel valves and activates the at least one igniter to ignite the one or more gas fuel burners or burner elements.

Further aspects, features, and advantages of the present invention will be apparent to those in the art upon examining the accompanying drawings and upon reading the following detailed description of the preferred embodiments.

DETAILED DESCRIPTION OF THE PREFERRED EMBODIMENTS

Figure 1:
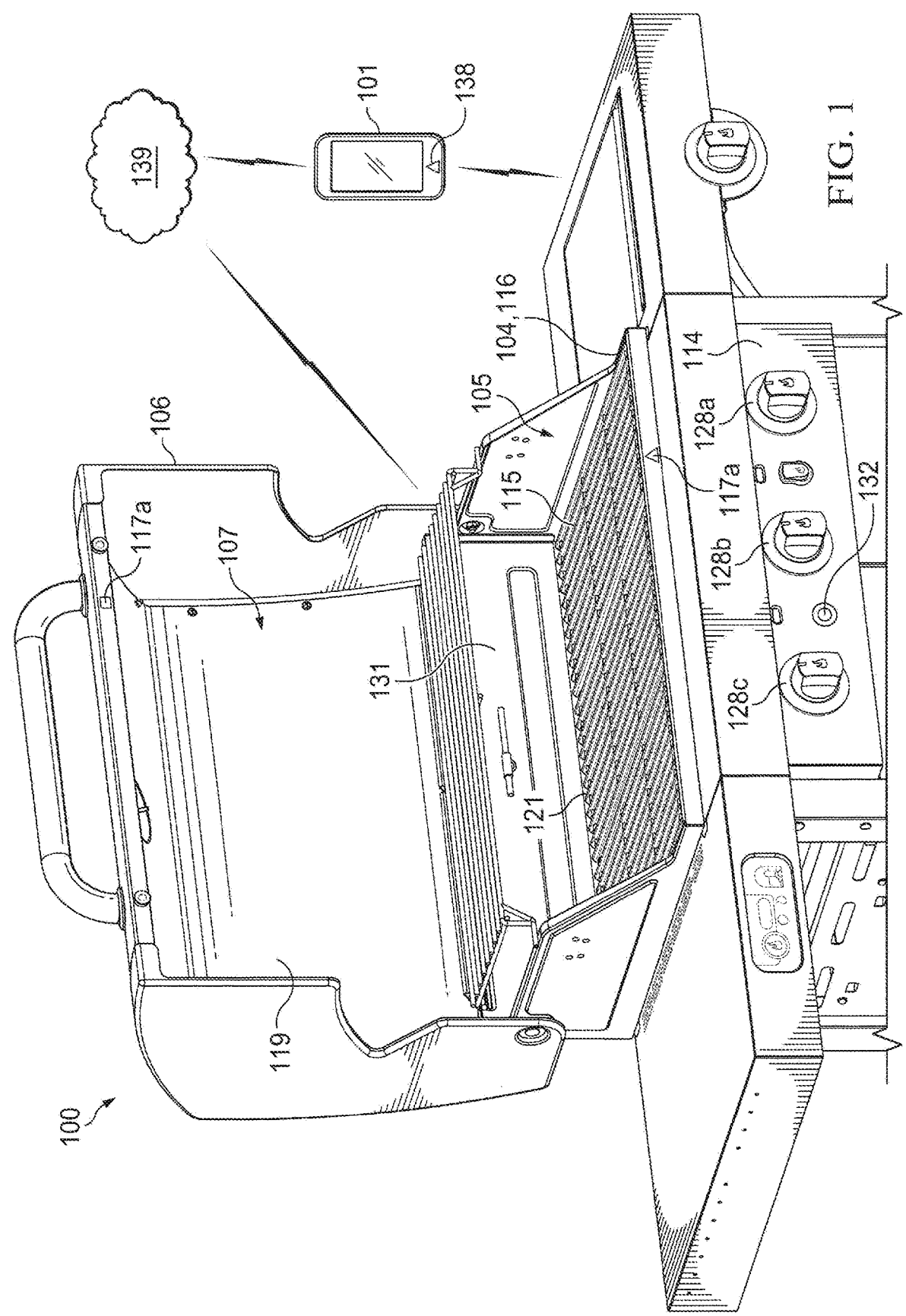
FIG. 1 is a front perspective view of an embodiment 100 of the inventive outdoor system for cooking and smoking.
Figure 2:
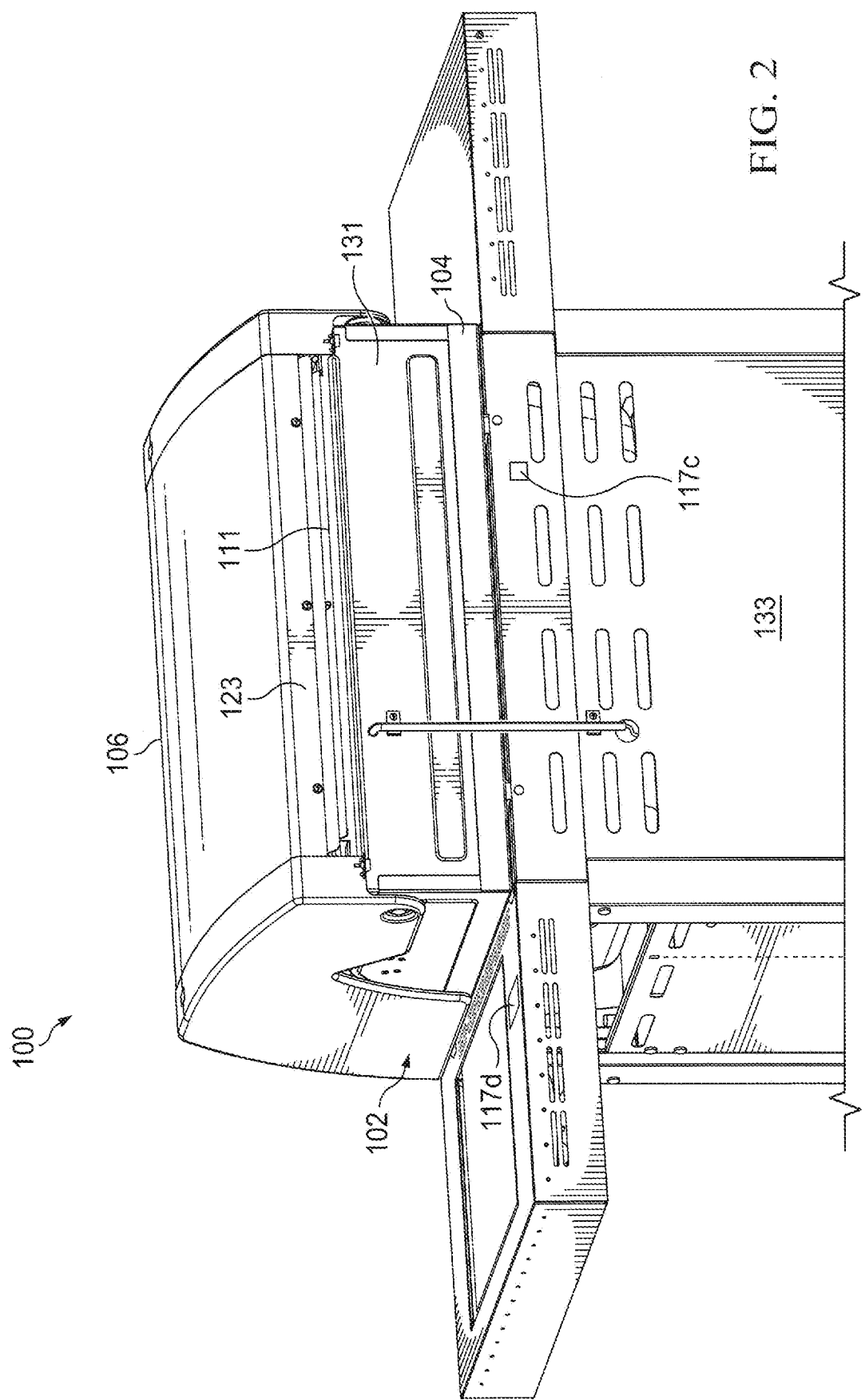
FIG. 2 is a rear perspective view of the inventive outdoor system 100.

An embodiment 100 of the inventive outdoor cooking and/or smoking system is illustrated in FIGS. 1-5. The inventive outdoor cooking and/or smoking system 100 comprises an outdoor cooking and/or smoking unit 102 and a portable hand-held wireless device 101. The outdoor cooking and/or smoking unit 102 can be an outdoor grill, outdoor smoker, outdoor convective cooker, outdoor radiant (i.e., infrared) cooker, outdoor tube broiler, or any other type of outdoor cooking and/or smoking unit. In addition, the outdoor cooking and/or smoking unit can be heated using any type of heating element(s) including, but not limited to, one or more gas fuel burners or gas fuel burner elements, one or more electric heating elements, or one or more gas infrared burners. The outdoor cooking and/or smoking unit 102 can also utilize any type of lid, door, or other cover for opening and closing the interior cooking and/or smoking chamber of the unit 102.

The outdoor cooking and/or smoking unit 102 illustrated in FIGS. 1-5 is a gas grill comprising a lower cooker housing 104 and a pivotable lid 106 for opening and closing the top opening 116 of the cooker housing 104. When the lid 106 is positioned on the cooker housing 104, the interior 105 of the cooker housing 104 and the interior 107 of the lid 106 together define an interior cooking chamber 108 of the cooking system 100.

The outdoor cooking system 100 also preferably comprises: one or more (preferably a plurality of) individual burner assemblies 110a, 110b, 110c having burner elements 112a, 112b, 112c positioned within the interior 105 of the cooker housing 104; at least one igniter 113 positioned in the interior 105 of the cooker housing 104 or otherwise positioned in sufficient proximity to the one or more burner assemblies 110a, 110b, 110c for lighting the burner elements 112a, 112b, 112c; one or more removable cooking grates or other food support structure(s) 115 positioned in the cooking chamber 108 above the burner elements 112a, 112b, 112c and preferably positioned at or near the top opening 116 of the cooker housing 104; one or more condition sensors 117a, 117b, 117c and/or 117d positioned for sensing one or more conditions of, or related to, the outdoor cooking and/or smoking unit 102; a control unit 125, some or all of the components of which are be located within or on the outdoor cooking and/or smoking unit 102; a propane tank or other fuel container 130 positioned in a cabinet 133 of the outdoor cooking and/or smoking unit 102 below the cooker housing 104; a fuel delivery system 134 for deliver a gas fuel from the fuel container 130 to the one or more burner assemblies 110a, 110b, 110c; and a manual enabling element 132 on the cooking and/or smoking unit 102.

In addition, although not shown, it will be understood that lava rocks, burner shields, one or more infrared emitter plates, or similar elements or structures employed in gas grills or in gas infrared cookers can also be installed in the cooking chamber 108 between the burner elements 112a, 112b, 112c and the food support structure 115.

Figure 3:
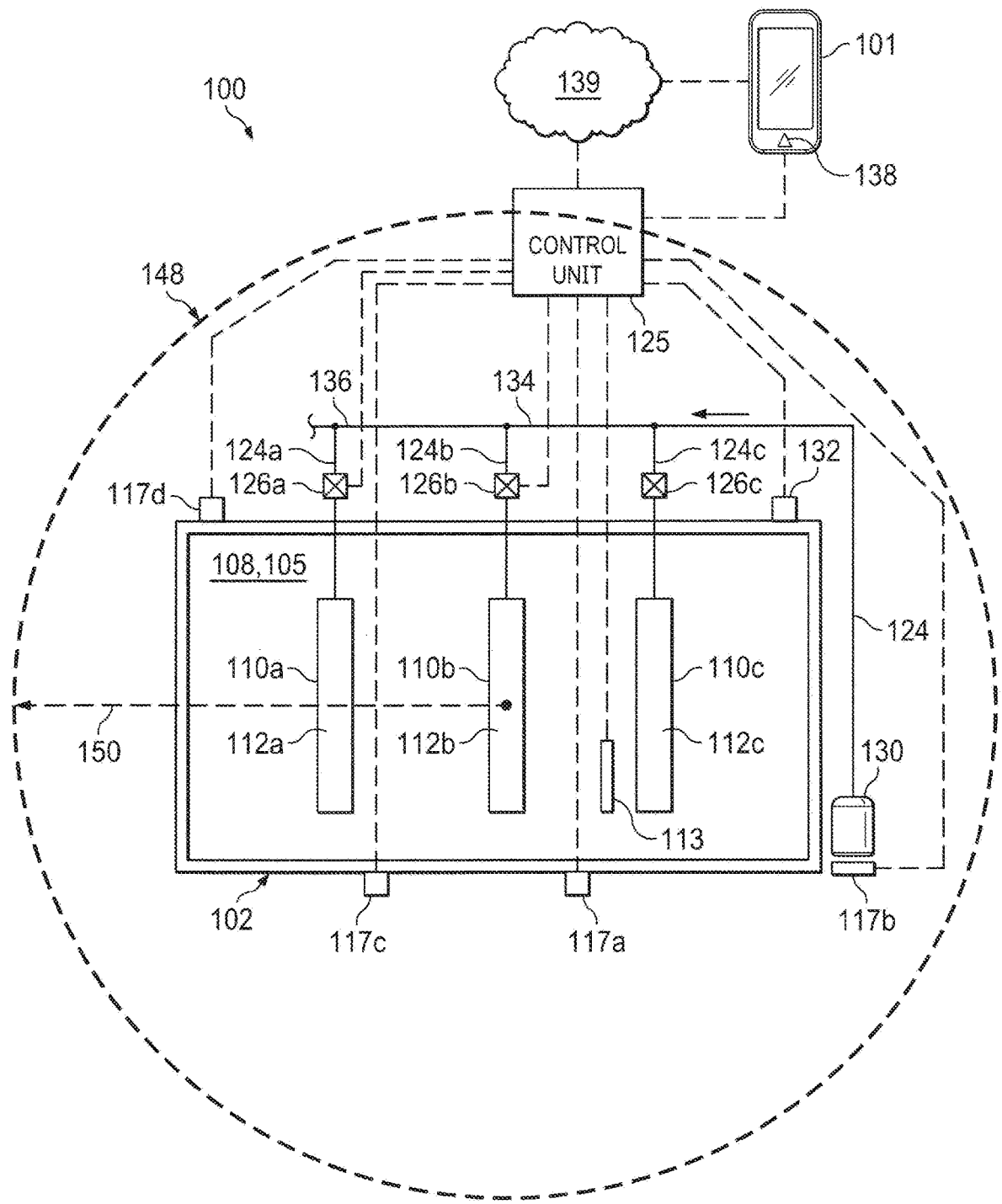
FIG. 3 schematically illustrates the inventive outdoor system 100.

Each of the burner assemblies 110a, 110b, 110c used in the inventive cooker 100 can be a tube burner assembly, a pan burner assembly, a box burner assembly, an infrared burner assembly, or generally any other type of gas fuel burner assembly or element known in the art. Each of the gas burner assemblies 110a, 110b, and 110c illustrated in FIG. 3 is a tube burner assembly which comprises a tube burner element 112a, 112b, or 112c which extends from front to back through a lower or mid portion of the interior 105 of the cooker housing 104.

Examples of igniters 113 suitable for use in the inventive outdoor system 100 for remotely igniting the burner elements 112a, 112b, and 112c include, but are not limited to, electronically driven high voltage spark igniters, or electronically controlled hot wire or hot surface igniters.

Each of the burner assemblies 110a, 110b, and 110c also includes a fuel inlet 124a, 124b, or 124c which is part of the fuel delivery system 134. The fuel delivery system 134 also comprises: a main fuel line 124 which extends from the fuel container 130; a manifold 136 which receives the fuel from the main fuel line 124 and delivers the fuel to the fuel inlets 124a, 124b, or 124c of the burner assemblies 110a, 110b, and 110c; control valves 126a, 126b, and 126c included in the individual fuel inlets 124a, 124b, and 124c for opening and controlling the rate of fuel flow and for shutting off the flow of fuel to the burner elements 112a, 112b, and 112c; and hand knobs or dials 128a, 128b, and 128c which allow the user to manually operate the control valves 126a, 126b, and 126c when desired. The hand knobs 128a, 128b, and 128c are preferably located on the front control panel 114 of the inventive cooker 100.

The hand-held wireless device 101 includes or is coupled with a GPS receiver or other GPS locating element 138 for the purpose of locating the GPS position of the hand-held device 101. The hand-held device 101 also wirelessly communicates with the control unit 125, either directly or through a remote server or other cloud system 139, to remotely instruct the control unit 125 to activate and/or control at least one operation of the of the outdoor cooking and/or smoking unit 102. Examples of such operations include, but are not limited to: turning on the gas fuel flow to the burner assemblies 110a, 110b, and 110c and igniting the burner elements 112a, 112b, or 112c; shutting off the flow of gas fuel to the burner assemblies 110a, 110b, and 110c to extinguish the burner elements 112a, 112b, or 112c; controlling the cooking and/or smoking process in accordance with any parameters and instructions which are input by the user via the hand-held device 101 such as desired time intervals for operation at specific and different gas flow settings.

Examples of preferred hand-held devices 101 include, but are not limited to, smart phones or tablets which are app enabled for communicating with the control unit 125 located in or on the outdoor cooking and/or smoking unit 102 through Bluetooth, Bluetooth Login Energy, Wi Fi or some similar wireless RE protocol, or a hand-held remote specifically designed to work with the outdoor cooking and/or smoking unit using an infrared modulated signal.

The control unit 125 of the outdoor cooking and/or smoking unit 102 can include any desired type and/or number of components wherein, for example (a) the components comprise separate, electronically linked modules which are located together in the outdoor cooking and/or smoking unit 102 or (b) the components comprise separate, electronically linked modules wherein one or more of the modules is/are installed at different locations in the inventive cooking system 100, or (c) the components are located together and electronically linked on a single circuit board located in or on the outdoor cooking and/or smoking unit 102, or (d) the components are otherwise located together in a single piece of hardware positioned in or on the outdoor cooking and/or smoking unit 102. Consequently, it will be understood that one or more of the components of the control unit 125, and/or the functions thereof, can alternatively be located or performed in the World Wide Web using the remote server or other cloud system 139 or can alternatively be located or performed in the hand-held device 101.

Figure 4:
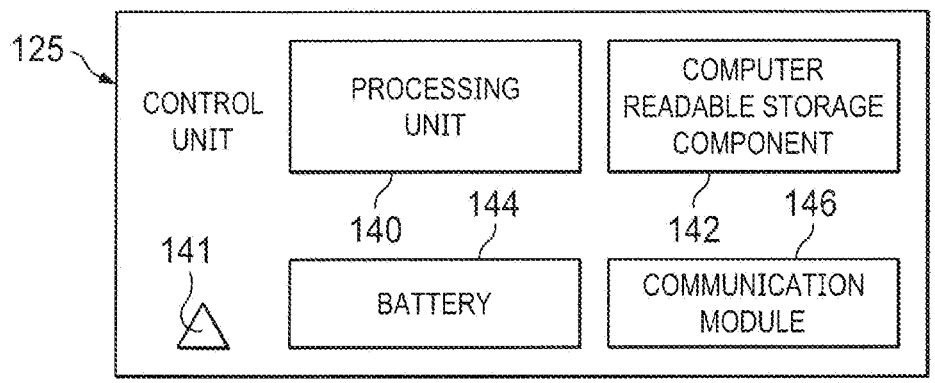
FIG. 4 schematically illustrates the control unit 125 of the inventive outdoor system 100.
Figure 5:
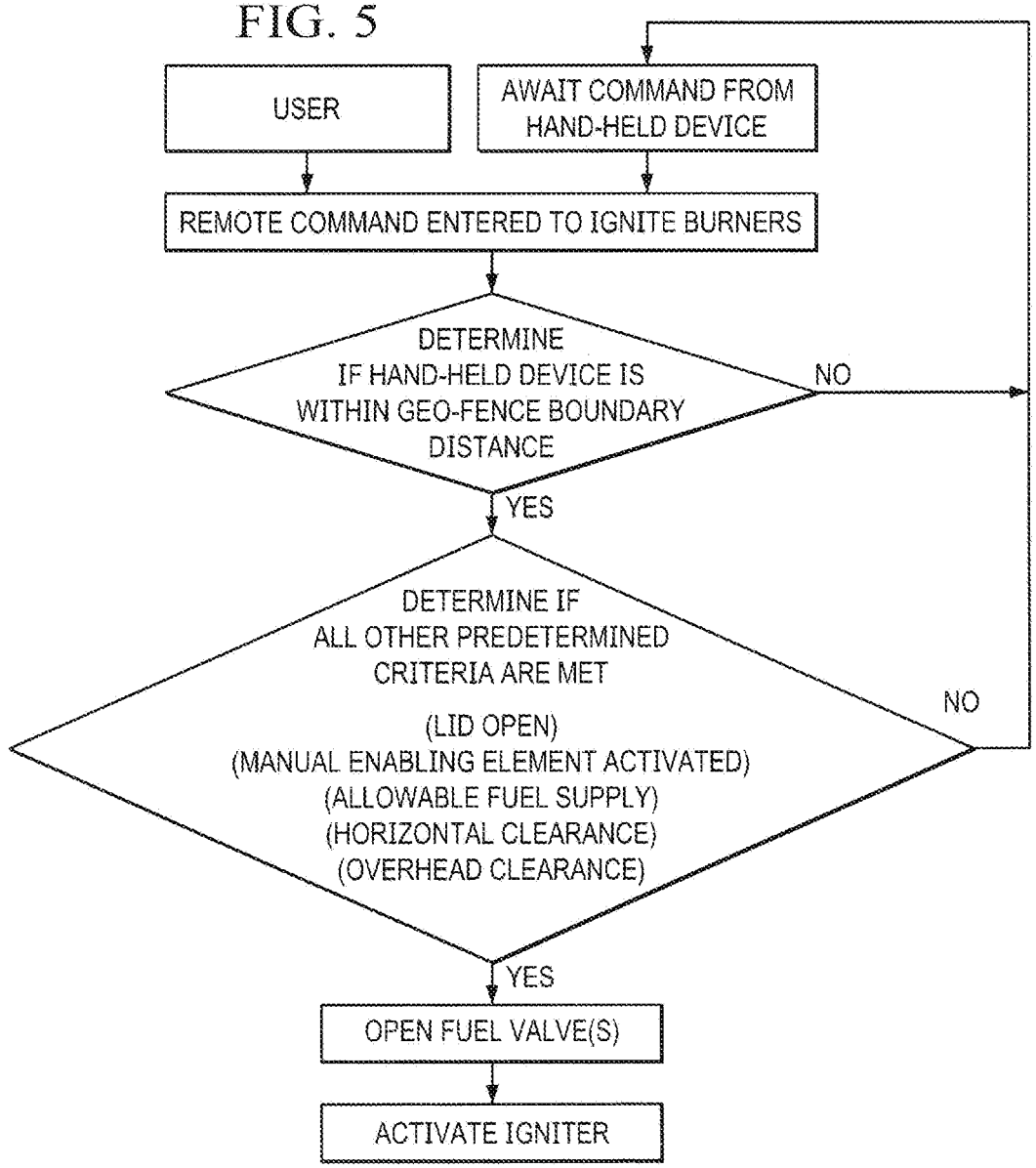
FIG. 5 is a flow chart of a program code embodied and used in the control unit 125 of the inventive outdoor system 100.

As illustrated FIG. 4, the control unit 125 includes a GPS receiver or other GPS locating element 141 which is located in or on the outdoor cooking and/or smoking unit 102 for the purpose of determining the GPS position of the outdoor cooking and/or smoking unit 402. The control unit 125 preferably also comprises: a microprocessor or other computer processing unit 140, a computer readable medium, device, or other storage component 142 which is readable by the processing unit 140; a battery 144 and/or a power cord for powering the control unit 125 and the other electrical components of the automated system 100; and a Bluetooth, radio frequency, infrared, Wi-Fi, and/or other wireless communication module 146 for wirelessly receiving communication signals from and wirelessly sending communication signals to the hand-held device 101 either (a) directly, (b) via the remote server or other cloud system 139, or (c) both.

In order to receive additional status and operational information regarding the outdoor cooking and/or smoking unit 102 and to execute programmed instructions, the control unit 125 is preferably also electronically linked, using wireless, wired, circuit board, or other connections, to the burner gas control valves 126a, 126b, and 126c, the igniter 113, the one or more condition sensors 117a, 117b, 117c and/or 117d, and the manual enabling element 132. The control logic and other programmed instructions (illustrated in the flow chart of FIG. 5) for the control unit 1 are preferably embodied (i.e., stored) on the computer readable storage component 142 of the control unit 125 in the form of a program code which is readable by the processing unit 140 to cause the control unit 125 to automatically perform, activate, and/or control certain operations and functions.

In one such operation, the control unit 125 of the inventive system 100 automatically determines whether the hand-held device 101 is currently positioned within or beyond the boundary limit 14 of a figurative "geo-fence" around the outdoor cooking and/or smoking unit 102. The geo-fence boundary limit 14 can be any preselected radial GPS distance 150 from outdoor cooking and/or smoking unit 102. In accordance with the programmed procedure of the inventive system 100, if the hand-held device 101 is currently located beyond the preselected GPS distance 150 from outdoor cooking and/or smoking unit 102, the control unit 125 will be prevented by the programmed procedure from complying with a remote instruction from the hand-held device 101 to automatically activate and/or control at least one operation of the outdoor cooking and/or smoking unit 102. However, on the other hand, if the hand-held device 101 is currently within the preselected GPS boundary distance 150 from the outdoor cooking and/or smoking unit 102, the control unit 125 will not be prevented, at least by the GPS distance determination, from performing the operation in question in accordance with the remote instruction received from the hand-held unit 101. The control unit 125 may send a signal to the hand-held unit 101 to activate a display informing the user that the hand-held unit 101 is inside or outside of the goo-fenced boundary limit 148.

In order to allow the control unit 125 to determine the current GPS distance of the hand-held unit 101 from the outdoor cooking and/or smoking unit 102, the GPS location of the hand-held unit 101 can be automatically transmitted to the control unit 125 by the hand-held unit 101. Alternatively, the control unit 125 can be programmed to track the GPS location of the hand-held unit using, e.g., an internet GPS tracking app which operates via the remote server or other cloud system 139.

The preselected radial GPS distance 150 of the geo-fence boundary 148 from the outdoor cooking and smoking unit 102 can be any distance suitable for ensuring a desired closeness of the user or line-of-sight view of the outdoor cooking and/or smoking unit 102 when remotely performing the operation(s) in question. Also, the programmed geo-fence boundary distance 150 for permitting some remote operations can be farther or closer than the distance permitted for others.

By way of example, in accordance with a programmed procedure of the inventive outdoor system 100 for remotely igniting the burner elements 112a, 112b, and 112c of the outdoor cooking and/or smoking unit 102, the radial GPS distance 150 of the geo-fence boundary 148 from the cooking and/or smoking unit 102 will preferably be not more than 10 meters and will more preferably be not more than 5 meters. In other words, if the preselected geo-fence boundary distance 150 is 5 meters and the current distance of the user, or more accurately the distance of the hand-held device 101, is more than 5 meters from the outdoor cooking and/or smoking unit 102, the user will not be permitted to remotely ignite the burner elements 112a, 112b, and 112c. On the other hand if the distance of the hand-held device 101 from the outdoor cooking and/or smoking unit 102 is 5 meters or less, the programmed geo-fence distance 150 determination performed by the control unit 125 will not prevent the user from remotely igniting the burner elements 112$_a$,112b, and 112c.

Consequently, if, in accordance with the programmed procedure, the control unit determines that the handheld device 101 is within the geo-fence boundary distance 150, and assuming that there or no other program restrictions barring such operation, the control unit 125 will comply with the remote instruction received from the user to start the cooking and/or smoking unit 102 by (1) first opening the burner gas control valves 126a, 126b, and 126c and then (2) activating the igniter 113 to ignite the burner elements 112a, 112b, and 112c.

However, prior to starting the outdoor cooking and/or smoking unit 102, in accordance with another aspect of the inventive system 100 which is preferably included in the program code of the control unit 125, the control unit 125 can also automatically determine whether at least one sensed condition of the outdoor cooking and/or smoking unit 102, as communicated to the control unit 125 from the condition sensors 117a, 117b, 117c and/or 117d, and/or by the manual enabling element 132, satisfies a predetermined criterion of acceptability. If the sensed condition does not satisfy a predetermined criterion of acceptability, the control unit 125 will not open the fuel valves 126a, 126b, and 126c and will not activate the at least one igniter 113 to ignite the one Or more gas fuel burners or burner elements 112a, 112b, and 112c, regardless of whether the hand-held wireless device 101 is located within the predetermined geo-fence distance 150 from the outdoor cooking and/or smoking unit 102.

As an example of one such predetermined criterion for allowing the user to remotely ignite the burner elements 112a, 112b, and 112c and/or remotely perform other operations, the sensor 117a senses whether the lid, door, or other cover 106 of the cooking and/or smoking unit is closed. In this programmed scenario, if the lid 106 is closed, the control unit 125 will be prevented from igniting the burner elements 112a, 112b, and 112c (and/or activating or controlling one or more other operations) regardless of whether the hand-held wireless device 101 is located within the predetermined geo-fence distance 150 from the outdoor cooking and/or smoking unit 102.

The sensor 117a will preferably be a magnetic proximity device having corresponding elements positioned on the cooker housing 104 and the lid or other cover 106. Alternatively, examples of other sensors which can be used for determining whether the door, or other cover 106 has been closed include, but are not limited to, mechanical plungers and optical encoders.

As an example of another predetermined criterion for allowing the user to remotely ignite the burner elements 112a, 112b, and 112c and/or remotely perform other operations, the control unit 125 can determine whether it is receiving or has received a signal from the manual enabling clement 132 indicating that the manual enabling element 132 on the cooking and/or smoking unit 102 has been manually activated by the user. Examples of suitable manual enabling elements 132 include, but are not limited to, electronic push buttons, rocker switches, knobs, or touch screen elements.

A requirement that the user must activate a manual enabling element 132 on the cooker and/or smoker 102 before one or more operations can be performed remotely helps to farther ensure that the user has seen and verified the current condition of the cooker and/or smoker 102 and is in sufficient proximity thereto. In this programmed scenario, if the user has not manually activated the manual enabling element 132, the control unit 105 will be prevented from igniting the burner elements 112a, 112b, and 112c (and/or activating and/or controlling one or more other operations) regardless of whether the hand-held wireless device 101 is located within the predetermined geo-fence distance 150 from the outdoor cooking and/or smoking unit 102.

As an example of another predetermined criterion for allowing the user to remotely ignite the burner elements 112a, 112b, and 112c and/or remotely perform other operations, the sensor 117b can he a weight sensor under the fuel container 130, or other suitable sensor, which will send information to the control unit 125 which allows the control unit 125 to determine whether the fuel container 130 contains at least a predetermined minimum amount of fuel, in this programmed scenario, if the fuel supply container 130 does not contain at least the predetermined minimum amount of fuel, the control unit 125 will he prevented from igniting the burner elements 112a, 112b, and 112c (and/or activating or controlling one or more other operations) regardless of whether the hand-held wireless device 101 is located within the predetermined geo-fence distance 150 from the outdoor cooking and/or smoking unit 102.

As an example of another predetermined criterion for allowing the user to remotely ignite the burner elements 112a, 112b, and 112c and/or remotely perform other operations, the sensor 117c attached to the exterior of the outdoor cooking and/or smoking unit 102 is a horizontal proximity sensor which senses whether a wall of the user's home, a fence or any other structure is located within a predetermined horizontal distance of the cooking and/or smoking unit 102. In this programmed scenario, if any other structure is located within the predetermined horizontal distance from the outdoor cooking and/or smoking unit 102, the control unit 125 will be prevented from igniting the burner elements 112a, 112b, and 112c (and/or activating or controlling one or more other operations) regardless of whether the hand-held wireless device 101 is located within the predetermined geo-fence distance 150 from the outdoor cooking and/or smoking unit 102.

Similarly, as an example of another predetermined criterion for allowing the user to remotely ignite the burner elements 112a, 112b, and 112c and/or remotely perform other operations, the sensor 117d attached to the exterior of the outdoor cooking and/or smoking unit 102 is a vertical proximity sensor which senses whether a patio cover, awning, any other structure is located within a predetermined vertical distance directly above the cooking and/or smoking unit 102. In this programmed scenario, if any other structure is located within the predetermined vertical distance above the outdoor cooking and/or smoking unit 102, the control unit 125 will be prevented from igniting the burner elements 112a, 112b, and 112c (and/or activating or controlling one or more other operations) regardless of whether the hand-held wireless device 101 is located within the predetermined geo-fence distance 150 from the outdoor cooking and/or smoking unit 102.

Examples of suitable proximity sensors 117c and 117d include, but are not limited to, laser sensors, ultrasonic sonar sensors, cameras with autofocusing ranging technology and the like.

Figure 6:
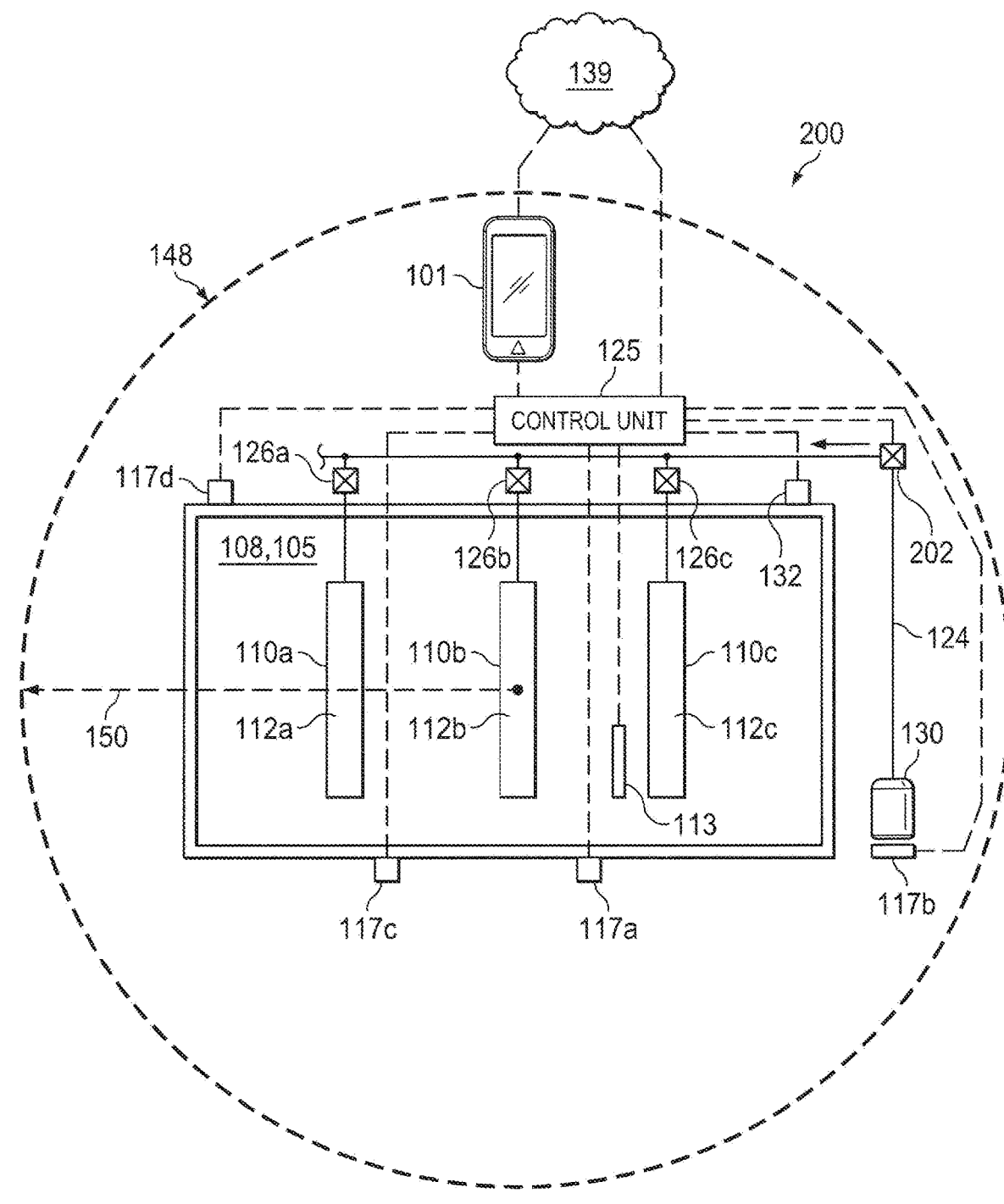
FIG. 6 schematically illustrates an alternative embodiment 200 of the inventive outdoor system for cooking and or smoking.

An alternative embodiment 200 of the inventive outdoor cooking system is illustrated in FIG. 6. The inventive cooking system 200 is identical to the outdoor cooking system 100 illustrated in FIGS. 1-5 except that in the inventive system 200, the control unit 125 is not electronically linked to each of the gas Control valves 126a, 126b and 126c of the individual burner assemblies 110a, 110b, and 110c but instead operates single master valve 202 installed in the main fuel line 124 upstream of the individual valves 126a 126b, and 126c. Consequently, in each of the activation a ad control scenarios discussed above, when the hand held device 101 is located within the geo-fence boundary distance 150 and any and all other criteria of the programmed procedure are met, the control unit 125 will respond to a remote instruction from the hand-held unit 101 to start the outdoor cooking and/or smoking unit 102 by opening the master valve 202 and then activating the igniter 113 to ignite the burner elements 112a 112b, and 112c.

In one scenario for allowing the master valve 202 to be used in this manner to ignite the burner elements 112a, 112b, and 112c, the programmed procedure executed by the control unit 102 can include the preliminary steps, for example, of requiring that the user first (a) manually actuate the manual enabling element 132, which will then cause the control unit 125 to place the master valve 202 in closed position awaiting remote activation and (b) manually open the individual burner valves 126a, 126b, and 126c. Alternatively, in an example of another programmed scenario, the control unit 102 can include the step of requiring that the user first manually open the lid, thus activating the sensor 117a which will then cause the control unit 125 to be enabled to respond to a command to open the master valve 202.

The master valve 202 can be any type of electric valve capable of automatically opening and shutting off the flow of gas fuel in the manner described. Examples of suitable electric control valves include, but are not limited to, electric solenoid valves, electric proportioning solenoid valves, motor driven linear or rotary valves, or variable pressure controlling devices.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. An outdoor system for cooking food, smoking food, or a combination thereof comprising:
   an outdoor cooking and/or smoking unit having all interior;
   one or more heating elements in the interior of the outdoor cooking an smoking unit;
   a control unit located within or on the outdoor cooking and/or smoking unit which includes or is electronically coupled with a GPS receiver or other GPS locating element and is enabled to activate and/or control at least one operation of the outdoor cooking and/or smoking unit; and
   a hand-held wireless device which includes or is electronically coupled with a GPS receiver or other GPS locating element and wirelessly communicates with the control unit, either directly or through a server or other cloud system, to remotely instruct the control unit to activate and/or control the least one operation of the outdoor cooking and/or smoking unit;
   wherein the control unit, hand-held wireless device, the server or other cloud system, or a combination thereof automatically determines whether the hand-held device is within a predetermined GPS distance of the outdoor cooking and/or smoking unit so that the control unit is prevented from activating and/or controlling the at least one operation of the outdoor cooking and/or smoking unit if the hand-held wireless device is located beyond the predetermined distance from the outdoor cooking and/or smoking unit.

2. The outdoor system of claim 1 wherein the hand-held wireless device is a smart phone, a tablet, or a remote control, operating with Bluetooth, Bluetooth Low Energy, WiFi, or other radio frequency communications, or with modulated infrared signals.

3. The outdoor system claim 1 wherein:
   the one or more heating elements comprise at least one gas fuel burner or burner element having a gas fuel inlet;
   the outdoor system further comprises an igniter for igniting the gas fuel burner or burner element;
   the outdoor system further comprises a gas fuel supply conduit which supplies a gas fuel to the gas fuel inlet of the gas fuel burner or burner element; and
   the outdoor system further includes a fuel valve which is installed in either the gas fuel supply conduit or the gas fuel inlet of the gas fuel burner or burner element,
   wherein the at least one operation of the outdoor cooking and/or smoking unit which the control unit is enabled to activate and/or control when remotely instructed by the hand-held wireless device, provided that the hand-held wireless device is within the predetermined GPS distance from the outdoor cooking and/or smoking unit, comprises opening the fuel valve and activating the igniter to ignite the gas fuel burner or burner element.

4. The outdoor system of claim 3 wherein the fuel valve is an electric solenoid valve.

5. The outdoor system of claim 1 wherein:
   the one or more heating elements comprise a plurality of gas fuel burners or burner elements, each of the gas fuel burners or burner elements having a gas fuel inlet;
   the outdoor system further comprises at least one igniter for igniting the gas fuel burners or burner elements;
   the outdoor system further comprises a main fuel supply conduit which supplies a gas fuel to the gas fuel inlets of the gas fuel burners or burner elements; and
   the outdoor system further includes a fuel valve installed in the main fuel supply conduit,
   wherein the at least one operation of the outdoor cooking and/or smoking unit which the control unit is enabled to activate and/or control when remotely instructed by the hand-held wireless device, provided that the hand-held wireless device is within the predetermined GPS distance from the outdoor cooking and/or smoking unit, comprises opening the fuel valve and activating the at least one igniter to ignite the gas fuel burners or burner elements.

6. The outdoor system of claim 1 wherein:
   the one or more heating elements comprise a plurality of gas fuel burners or burner elements, each of the gas filet burners or burner elements having a gas fuel inlet;
   the outdoor system further comprises at least one igniter for igniting the gas fuel burners or burner elements; and
   the outdoor system further comprises filet valves installed in the gas fuel inlets of the gas fuel burners or burner elements,
   wherein the at least one operation of the outdoor cooking and/or smoking unit which the control unit is enabled to activate and/or control when remotely instructed by the hand-held wireless device, provided that the hand-held wireless device is within the predetermined GPS distance from the outdoor cooking and/or smoking unit, comprises opening the fuel valves in the gas fuel inlets of the gas fuel burners or burner elements and activating the at least one igniter to ignite the gas fuel burners or burner elements.

7. The outdoor system of claim 1 further comprising a condition sensor located on or in the outdoor cooking and/or smoking unit which sends a signal to the control unit indicating a sensed condition of, or in relation to, the outdoor cooking and/or smoking unit wherein if the sensed condition does not satisfy a predetermined criterion of acceptability, the control unit is prevented from activating and/or controlling the at least one operation of the outdoor cooking and/or smoking unit regardless of whether the hand-held wireless device is located within the predetermined GPS distance from the outdoor cooking and/or smoking unit.

8. The outdoor system of claim 7 wherein:
   the outdoor cooking and/or smoking unit further comprises a lid, door, or other cover for opening and closing the interior of the outdoor cooking and/or smoking unit;
   the condition sensor senses, as said predetermined criterion of acceptability, whether the lid, door, or other cover is closed; and
   if the lid, door, or other cover is closed, the control unit is prevented from activating and/or controlling the at least one operation of the outdoor cooking and/or smoking unit regardless of whether the hand-held wireless device is located within the predetermined GPS distance from the outdoor cooking and/or smoking unit.

9. The outdoor system of claim 8 wherein the condition sensor is a mechanical plunger, a magnetic proximity switch, or an optical encoder.

10. The outdoor system of claim 7 wherein:
the outdoor cooking and/or smoking unit further comprises a fuel supply container;
the condition sensor senses, as said predetermined criterion of acceptability, whether the fuel supply contain contains at least a predetermined minimum amount of fuel; and
if the fuel supply container does not contain at least the predetermined minimum amount of fuel, the control unit is prevented from activating and/or controlling the at least one operation of the outdoor cooking and/or smoking unit regardless of whether the hand-held wireless device is located within the predetermined GPS distance from the, outdoor cooking and/or smoking unit.

11. The outdoor system of claim 10 wherein the condition sensor is a weight sensor positioned beneath the fuel supply container.

12. The outdoor system of claim 7 wherein:
the condition sensor is horizontal proximity sensor;
the condition sensor senses, as said predetermined criterion of acceptability, whether any other structure is within a predetermined horizontal distance of the outdoor cooking and/or smoking unit; and
if any other structure is located within the predetermined horizontal distance from the outdoor cooking and/or smoking unit, the control unit is prevented from activating and/or controlling the at least one operation of the outdoor cooking and/or smoking unit regardless of whether the hand-held wireless device is located within the predetermined GPS distance from the outdoor cooking and/or smoking unit.

13. The outdoor system of claim 12 wherein the horizontal proximity sensor is a laser sensor.

14. The outdoor system of claim 7 wherein:
the condition sensor is a vertical proximity sensor;
the condition sensor senses, as said predetermined criterion of acceptability, whether any other structure is within a predetermined vertical distance directly above the outdoor cooking and/or smoking unit; and
if any other structure is located within the predetermined vertical distance directly above the outdoor cooking and/or smoking unit, the control unit is prevented from actuating and/or controlling the at least one operation of the outdoor cooking and/or smoking unit regardless of whether the hand-held wireless device is located within the predetermined GPS distance from the outdoor cooking and/or smoking unit.

15. The outdoor system of claim 12 wherein the vertical proximity sensor is a laser sensor.

16. The outdoor system of claim 1 further comprising a manual enabling element on the outdoor cooking and/or smoking unit which sends a signal to the control unit indicating that the manual enabling element has been manually activated wherein, unless the manual enabling element has been manually activated, the control unit is prevented from activating and/or controlling the at least one operation of the outdoor cooking and/or smoking unit regardless of whether the hand-held wireless device is located within the predetermined GPS distance from the outdoor cooking and/or smoking unit.

17. The outdoor system of claim 16 wherein the manual enabling element is an electronic button, rocker switch, knob, or touch screen element on the outdoor cooking and/or smoking unit.

18. An outdoor system for cooking food, smoking food, or a combination thereof comprising:
an outdoor cooking and/or smoking unit having an interior;
a plurality of gas fuel burners or burner elements in the interior of the outdoor cooking and/or smoking unit;
a gas fuel supply system for the gas fuel burners or burner elements, the gas fuel supply system comprising one or more fuel valves for opening a gas fuel flow from the gas fuel supply system to the gas fuel burners or burner elements;
at least one ignitor in sufficient proximity to the gas fuel burners or burner elements to ignite the gas fuel burners or burner elements;
a hand-held wireless device which includes or is electronically coupled with a GPS receiver or other GPS locating element and can be operated to remotely transmit a wireless instruction, either directly or through a remote server or other cloud system, to ignite the gas fuel burners or burner elements; and
a control unit located within or on the outdoor cooking and/or smoking unit which includes or is electronically coupled with a GPS receiver or other GPS locating element and which automatically receives the instruction from the hand-held wireless device to ignite the gas fuel burners or burner elements,
the control unit comprising a processing unit and a program code which is embodied on a computer readable storage component and is readable by the processing unit to cause the control unit to perform a programmed procedure in which the control unit automatically (a) determines whether the hand-held device is within a predetermined GPS distance of the outdoor cooking and/or smoking unit and, if the hand-held device is within the predetermined GPS distance from the outdoor cooking and/or smoking unit, then (b) opens the one or more fuel valves and activates the at least one igniter to ignite the one or more gas fuel burners or burner elements.

19. The outdoor system of claim 18 wherein the hand-held wireless device is a smart phone, a tablet, or a remote control, operating with Bluetooth, Bluetooth Low Energy, WiFi, or other radio frequency communications, or with modulated infrared signals.

20. The outdoor system of claim 18 wherein the hand-held wireless device transmits a GPS location signal which is received by the control unit and is used in accordance with the programmed procedure of the program code embodied on the computer readable storage component to determine whether the hand-held wireless device thin the predetermined GPS distance of the outdoor cooking and/or smoking unit.

21. The outdoor system of claim 18 wherein, in accordance with the programmed procedure of the program code embodied on the computer readable storage component, the control unit automatically tracks a GPS location of the hand-held wireless device and uses the GPS location of the hand-held wireless device to determine whether the hand-held wireless device is within the predetermined GPS distance from the outdoor cooking and/or smoking unit.

22. The outdoor system of claim 18 further comprising a condition sensor located on or in the outdoor cooking and/or smoking unit which sends a signal to the control unit indicating a sensed condition of, or in relation to, the outdoor cooking and/or Smoking unit wherein, in accordance with the programmed procedure of the program code embodied on the computer readable storage component, the control unit automatically determines whether the sensed condition satisfies a predetermined criterion of acceptability and if the sensed condition does not satisfy the predetermined criterion of acceptability, the control unit will not open the one or more fuel valves and activate the at least one igniter to ignite the one or more gas fuel burners or burner elements regardless of whether the hand-held wireless device is located within the predetermined GPS distance from the outdoor cooking and/or smoking unit.

23. The outdoor system of claim 22 wherein:
the outdoor cooling and/or smoking unit further comprises a lid, door, or other cover for opening and closing the interior of the outdoor cooking and/or smoking unit;
the condition sensor senses, as said predetermined criterion of acceptability, whether the lid, door, or other cover is closed; and
if the lid, door, or other cover is closed, the control unit will not open the one or more fuel valves and activate the at least one igniter to ignite the one or more gas fuel burners or burner elements regardless of whether the hand-held wireless device is located within the predetermined GPS distance from the outdoor cooking and/or smoking unit.

24. The outdoor system of claim 22 wherein:
the outdoor cooking and/or smoking unit further comprises a fuel supply container;
the condition sensor senses, as said predetermined criterion of acceptability, whether the fuel supply contain contains at least a predetermined minimum amount of fuel; and
if the fuel supply container does not contain at least the predetermined minimum amount of fuel, the control unit will not open the one or more fuel valves and activate the at least one igniter to ignite the one or more gas fuel burners or burner elements regardless of whether the hand-held wireless device is located within the predetermined GPS distance from the outdoor cooking and/or smoking unit.

25. The outdoor system of claim wherein:
the condition sensor is a horizontal proximity sensor;
the condition sensor senses, as said predetermined criterion of acceptability, whether any other structure is within a predetermined horizontal distance of the outdoor cooking and/or smoking unit; and
if any other structure is located within the predetermined horizontal distance from the outdoor cooking and/or smoking unit, the control unit will not open tine one or more fuel valves and activate the at least one igniter to ignite the one or more gas fuel burners or burner elements regardless of whether the hand-held wireless device is located within the predetermined GPS distance from the outdoor cooking and/or smoking unit.

26. The outdoor system of claim 22 wherein:
the condition sensor is a vertical proximity sensor;
the condition sensor senses, as said predetermined criterion of acceptability, whether any other structure is within a predetermined vertical distance directly above the outdoor cooking and/or smoking unit; and
if any other structure is located within the predetermined vertical distance directly above the outdoor cooking and/or smoking unit, the control unit will not open the one or more fuel valves and activate the at least one igniter to ignite the one or more gas fuel burners or burner elements regardless of whether the hand-held wireless device is located within the predetermined GPS distance from the outdoor cooking and/or smoking unit.

27. The outdoor system of claim 18 further comprising a manual enabling element on the outdoor cooking and/or smoking unit which sends a signal to the control unit indicating that the manual enabling element has been manually activated wherein, in accordance with the programmed procedure of the program code embodied on the computer readable storage component, unless the manual enabling element has been manually activated, the control unit will not open the one or more fuel valves and activate the at least one igniter to ignite the one or more gas fuel burners or burner elements regardless of whether the hand-held wireless device is located within the predetermined GPS distance from the outdoor cooking and/or smoking unit.

28. The outdoor system of claim 27 wherein the manual enabling element is an electronic button, rocker switch, knob, or touch screen element on the outdoor cooking and/or smoking unit.

* * * * *